(12) United States Patent
Yamagishi et al.

(10) Patent No.: US 10,607,638 B2
(45) Date of Patent: Mar. 31, 2020

(54) MAGNETIC HEAD AND MAGNETIC RECORDING AND REPRODUCING DEVICE

(71) Applicant: KABUSHIKI KAISHA TOSHIBA, Tokyo (JP)

(72) Inventors: Michinaga Yamagishi, Zama Kanagawa (JP); Tazumi Nagasawa, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 16/675,279

(22) Filed: Nov. 6, 2019

(65) Prior Publication Data

US 2020/0075048 A1   Mar. 5, 2020

Related U.S. Application Data

(62) Division of application No. 16/119,395, filed on Aug. 31, 2018, now Pat. No. 10,504,544.

(30) Foreign Application Priority Data

Mar. 1, 2018   (JP) .................................. 2018-036487

(51) Int. Cl.
*G11B 5/39* (2006.01)
*G11B 5/35* (2006.01)
*H01F 10/32* (2006.01)

(52) U.S. Cl.
CPC .............. *G11B 5/3945* (2013.01); *G11B 5/35* (2013.01); *H01F 10/329* (2013.01); *H01F 10/3286* (2013.01)

(58) Field of Classification Search
CPC ......... G11B 5/3945; G11B 5/35; H01F 10/329; H01F 10/3286
(Continued)

(56) References Cited

U.S. PATENT DOCUMENTS 6,124,711 A    9/2000 Tanaka et al.
8,902,544 B2   12/2014 Braganca et al.
(Continued)

FOREIGN PATENT DOCUMENTS

JP          5460792 B2       4/2014
JP        2014-120197 A      6/2014

*Primary Examiner* — Allen T Cao
(74) *Attorney, Agent, or Firm* — Finnegan, Henderson, Farabow, Garrett & Dunner, L.L.P.

(57) ABSTRACT

According to one embodiment, a magnetic head includes a reproducing portion. The reproducing portion includes first to fourth magnetic portions and a stacked body. The third magnetic portion is provided between the first and second magnetic portions. The fourth magnetic portion is provided between the first and second magnetic portions. A second direction from the third magnetic portion toward the fourth magnetic portion crosses a first direction from the first magnetic portion toward the second magnetic portion. The stacked body is provided between the first and second magnetic portions in the first direction and between the third and fourth magnetic portions in the second direction. The stacked body includes a first magnetic layer, a second magnetic layer provided between the first magnetic layer and the second magnetic portion in the first direction, and an intermediate layer provided between the first and second magnetic layers in the first direction.

16 Claims, 11 Drawing Sheets

(58) Field of Classification Search
USPC .............................................. 360/324–324.2
See application file for complete search history.

(56) References Cited

U.S. PATENT DOCUMENTS

| | | | |
|---|---|---|---|
| 2005/0117251 A1* | 6/2005 | Matono ................. | G11B 5/3116 |
| | | | 360/125.12 |
| 2014/0049857 A1* | 2/2014 | Isowaki ............... | G11B 5/3163 |
| | | | 360/244 |
| 2015/0243308 A1* | 8/2015 | Takagishi ............. | G11B 5/3912 |
| | | | 360/244 |
| 2016/0282101 A1 | 9/2016 | Kaji et al. | |
| 2018/0159024 A1 | 6/2018 | Buyandalai et al. | |

\* cited by examiner

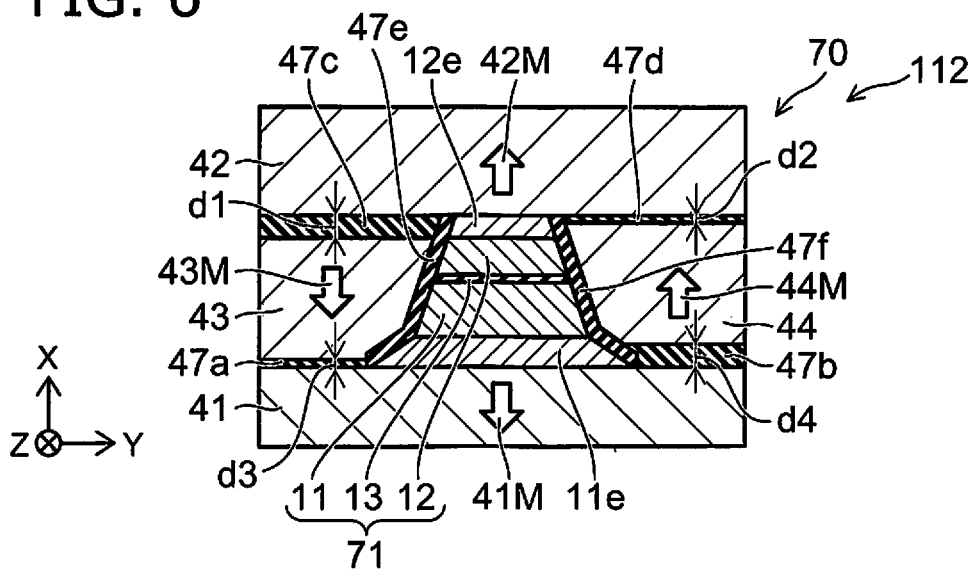
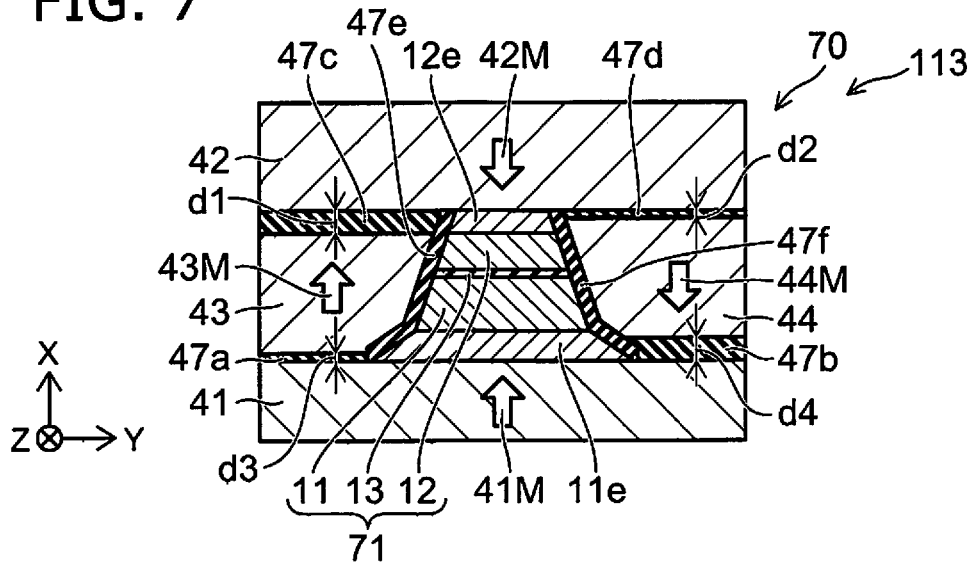

MAGNETIC HEAD AND MAGNETIC RECORDING AND REPRODUCING DEVICE

CROSS-REFERENCE TO RELATED APPLICATIONS

This application is a divisional application of U.S. patent application Ser. No. 16/119,395, filed Aug. 31, 2018, which is based upon and claims the benefit of priority from Japanese Patent Application No. 2018-036487, filed on Mar. 1, 2018; the entire contents of which are incorporated herein by reference.

FIELD

Embodiments described herein relate generally to a magnetic head and a recording and reproducing device.

BACKGROUND

It is desirable to increase the recording density of a magnetic recording and reproducing device.

BRIEF DESCRIPTION OF THE DRAWINGS

FIG. 6 is a schematic view illustrating the magnetic head according to the first embodiment;

FIG. 7 is a schematic view illustrating the magnetic head according to the first embodiment;

DETAILED DESCRIPTION

Figure 1A:
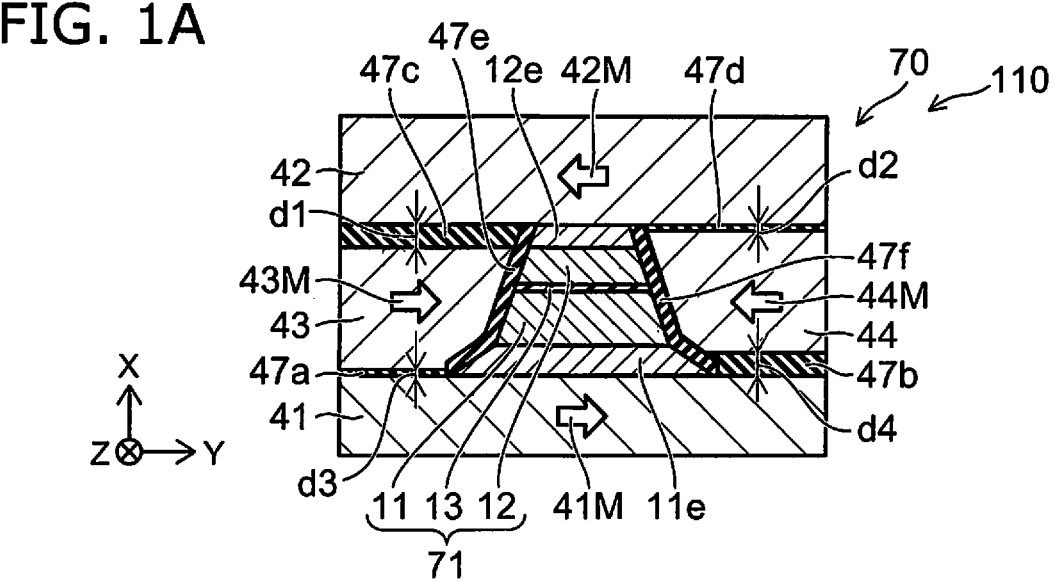
FIG. 1A to FIG. 1C are schematic views illustrating a magnetic head according to a first embodiment.

According to one embodiment, a magnetic head includes a reproducing portion. The reproducing portion includes first to fourth magnetic portions and a stacked body. The third magnetic portion is provided between the first magnetic portion and the second magnetic portion. The fourth magnetic portion is provided between the first magnetic portion and the second magnetic portion. A second direction from the third magnetic portion toward the fourth magnetic portion crosses a first direction from the first magnetic portion toward the second magnetic portion. The stacked body is provided between the first magnetic portion and the second magnetic portion in the first direction and between the third magnetic portion and the fourth magnetic portion in the second direction. The stacked body includes a first magnetic layer, a second magnetic layer provided between the first magnetic layer and the second magnetic portion in the first direction, and an intermediate layer provided between the first magnetic layer and the second magnetic layer in the first direction, the intermediate layer being nonmagnetic. A first distance along the first direction between the second magnetic portion and the third magnetic portion is different from a second distance along the first direction between the second magnetic portion and the fourth magnetic portion.

According to another embodiment, a magnetic head includes a reproducing portion. The reproducing portion includes first to fourth magnetic portions, a stacked body, an insulating portion, and another insulating portion. The third magnetic portion is provided between the first magnetic portion and the second magnetic portion. The fourth magnetic portion is provided between the first magnetic portion and the second magnetic portion. A second direction from the third magnetic portion toward the fourth magnetic portion crosses a first direction from the first magnetic portion toward the second magnetic portion. The stacked body is provided between the first magnetic portion and the second magnetic portion in the first direction and between the third magnetic portion and the fourth magnetic portion in the second direction. The insulating portion is provided between the fourth magnetic portion and the first magnetic portion. The other insulating portion is provided between the fourth magnetic portion and the second magnetic portion. The stacked body includes a first magnetic layer, a second magnetic layer provided between the first magnetic layer and the second magnetic portion in the first direction, and an intermediate layer provided between the first magnetic layer and the second magnetic layer in the first direction, the intermediate layer being nonmagnetic. The third magnetic portion contacts the first magnetic portion. The fourth magnetic portion contacts the second magnetic portion.

According to another embodiment, a magnetic recording and reproducing device includes one of the magnetic heads described above, a magnetic recording medium, and a controller. The controller is configured to supply a current between the first magnetic layer and the second magnetic layer. An oscillation is generated in the stacked body when the current flows between the first magnetic layer and the second magnetic layer.

Information of the magnetic recording medium is read by detecting a change of a frequency of the oscillation corresponding to an orientation of a magnetization of the magnetic recording medium.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

Figure 1B:
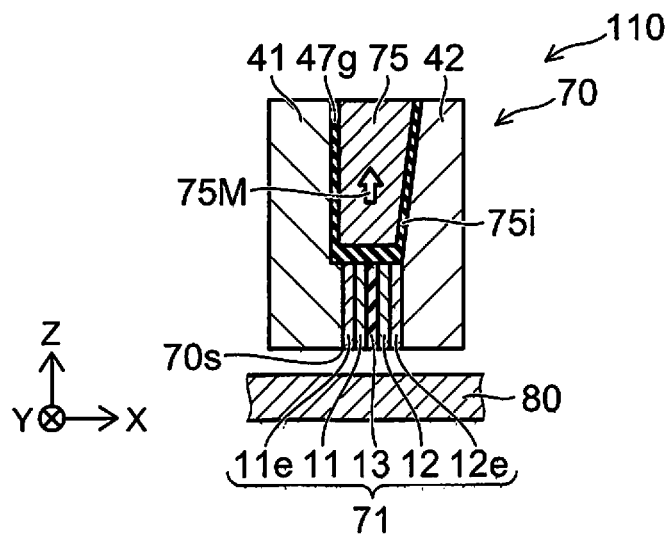
Figure 1C:
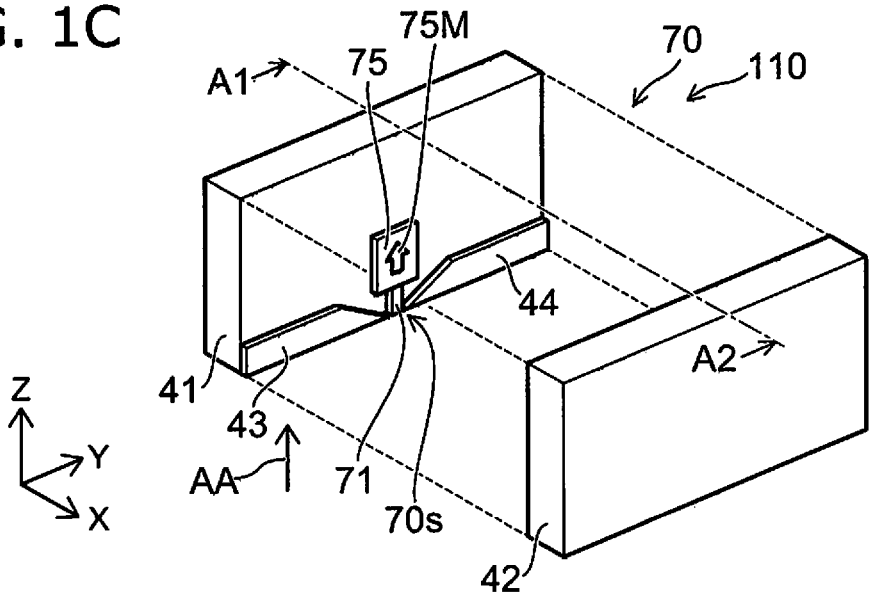

FIG. 1A to FIG. 1C are schematic views illustrating a magnetic head according to a first embodiment. FIG. 1A is a plan view as viewed along arrow AA of FIG. 1C. FIG. 1B is a line A1-A2 cross-sectional view of FIG. 1C. FIG. 1C is a perspective view. In FIG. 1C, the components are drawn as being separated from each other for easier viewing of the drawing.

Figure 2:
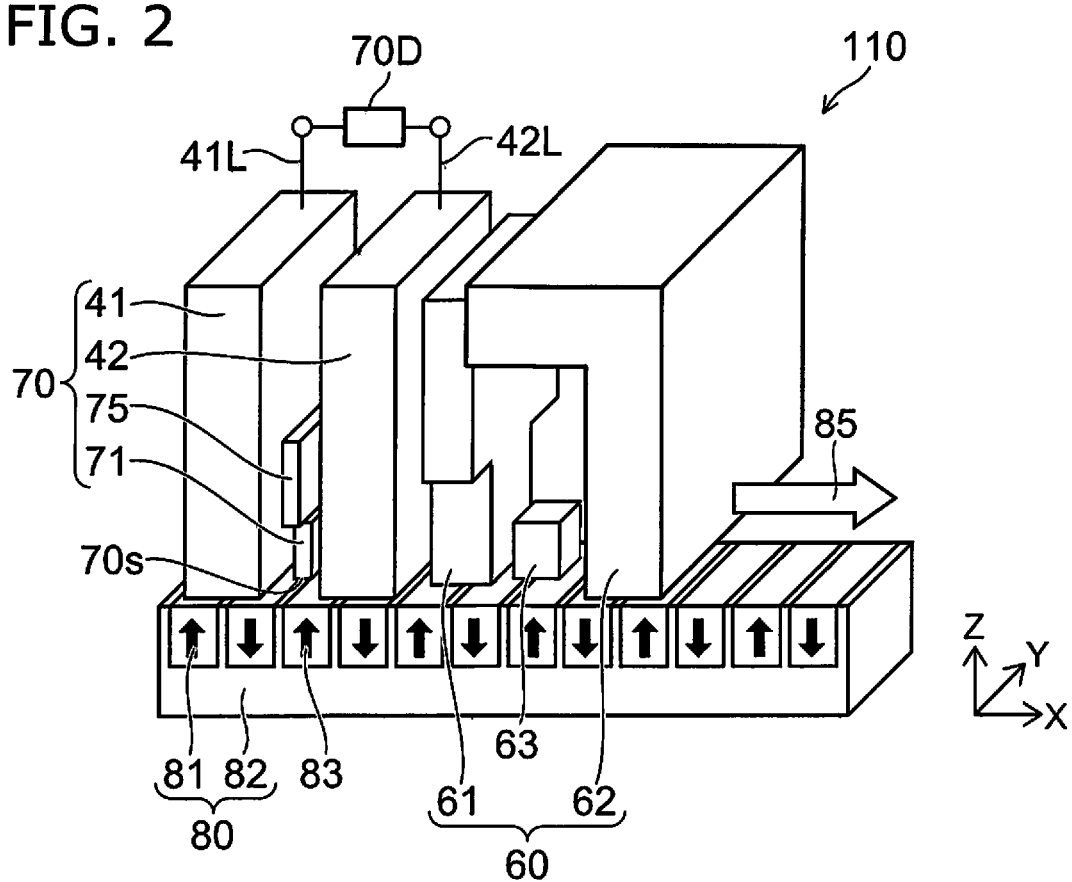
FIG. 2 is a schematic perspective view illustrating the magnetic head according to the first embodiment.

FIG. 2 is a schematic perspective view illustrating the magnetic head according to the first embodiment.

As shown in FIG. 2, the magnetic head 110 according to the embodiment includes a reproducing portion 70. A recording portion 60 is further provided in the example. The magnetic head 110 opposes a magnetic recording medium 80.

The magnetic recording medium 80 includes, for example, a medium substrate 82 and a magnetic recording layer 81. The magnetic recording layer 81 is positioned between the medium substrate 82 and the magnetic head 110. A magnetization 83 of the magnetic recording layer 81 is controlled by a magnetic field applied from the recording portion 60. Thereby, a recording operation is performed. The magnetic recording medium 80 moves relative to the magnetic head 110 along a medium movement direction 85.

In the example, the recording portion 60 includes a magnetic pole 61 (e.g., a major magnetic pole) and a write shield 62. In the example, an oscillation element 63 is provided between the magnetic pole 61 and the write shield 62. For example, the oscillation element 63 generates a high frequency magnetic field. The magnetization 83 of the portion of the magnetic recording medium 80 to which the high frequency magnetic field is applied changes easily. High frequency assisted recording is possible. The oscillation element 63 may be omitted in the embodiment.

The reproducing portion 70 opposes the magnetic recording medium 80. The reproducing portion 70 has a first surface 70s. The first surface 70s opposes the magnetic recording medium 80. The first surface 70s is, for example, an ABS (Air Bearing Surface). The first surface 70s is configured to oppose the magnetic recording medium 80. For example, the reproducing portion 70 is configured to detect the direction of the magnetization 83 of the magnetic recording layer 81. Thereby, a reproduction operation is performed. The reproducing portion 70 detects a recording signal recorded in the magnetic recording medium 80.

The reproducing portion 70 includes a first magnetic portion 41, a second magnetic portion 42, and a stacked body 71. In the example, the reproducing portion 70 further includes a fifth magnetic portion 75. The fifth magnetic portion 75 is described below.

The stacked body 71 is provided between the first magnetic portion 41 and the second magnetic portion 42. The direction from the first magnetic portion 41 toward the second magnetic portion 42 is taken as a first direction (an X-axis direction).

One direction perpendicular to the X-axis direction is taken as a Y-axis direction. A direction perpendicular to the X-axis direction and the Y-axis direction is taken as a Z-axis direction.

The direction from the magnetic recording medium 80 toward the reproducing portion 70 is aligned with the Z-axis direction. The Z-axis direction corresponds to a height direction. For example, the X-axis direction corresponds to a down-track direction. For example, the Y-axis direction corresponds to a cross-track direction.

In the example, the reproducing portion 70 includes a first interconnect 41L and a second interconnect 42L (referring to FIG. 2). One end of the first interconnect 41L and one end of the second interconnect 42L are electrically connected to the stacked body 71. In the example, the one end of the first interconnect 41L is electrically connected to the stacked body 71 via the first magnetic portion 41. The one end of the second interconnect 42L is electrically connected to the stacked body 71 via the second magnetic portion 42. It is possible to electrically connect the other end of the first interconnect 41L and the other end of the second interconnect 42L to a controller 70D. For example, a current is supplied from the controller 70D to the stacked body 71.

As shown in FIG. 1A, the reproducing portion 70 further includes a third magnetic portion 43 and a fourth magnetic portion 44 in addition to the stacked body 71, the first magnetic portion 41, and the second magnetic portion 42. The third magnetic portion 43 and the fourth magnetic portion 44 are not illustrated in FIG. 2.

The third magnetic portion 43 is provided between the first magnetic portion 41 and the second magnetic portion 42. The fourth magnetic portion 44 is provided between the first magnetic portion 41 and the second magnetic portion 42.

A second direction from the third magnetic portion 43 toward the fourth magnetic portion 44 crosses the first direction (the X-axis direction: the direction from the first magnetic portion 41 toward the second magnetic portion 42). The second direction is, for example, the Y-axis direction.

The stacked body 71 is provided between the first magnetic portion 41 and the second magnetic portion 42 in the first direction (the X-axis direction). The stacked body 71 is provided between the third magnetic portion 43 and the fourth magnetic portion 44 in the second direction (the Y-axis direction).

The stacked body 71 includes a first magnetic layer 11, a second magnetic layer 12, and an intermediate layer 13. The second magnetic layer 12 is provided between the first magnetic layer 11 and the second magnetic portion 42 in the first direction (the X-axis direction). The intermediate layer 13 is provided between the first magnetic layer 11 and the second magnetic layer 12 in the first direction. The intermediate layer 13 is nonmagnetic.

For example, the length (the thickness) along the first direction (the X-axis direction) of the first magnetic layer 11 is longer (thicker) than the length (the thickness) along the second direction of the second magnetic layer 12.

A first conductive layer 11e and a second conductive layer 12e are further provided in the example. These conductive layers are nonmagnetic. The first conductive layer 11e is positioned between the stacked body 71 and the first magnetic portion 41 in the first direction (the X-axis direction). The second conductive layer 12e is positioned between the stacked body 71 and the second magnetic portion 42 in the first direction (the X-axis direction).

First to sixth insulating portions 47a to 47f are provided in the example. These insulating portions may be continuous with each other.

The first insulating portion 47a is provided between the first magnetic portion 41 and the third magnetic portion 43. The second insulating portion 47b is provided between the first magnetic portion 41 and the fourth magnetic portion 44. The third insulating portion 47c is provided between the second magnetic portion 42 and the third magnetic portion 43. The fourth insulating portion 47d is provided between the second magnetic portion 42 and the fourth magnetic portion 44. The fifth insulating portion 47e is provided between the third magnetic portion 43 and the stacked body 71. The sixth insulating portion 47f is provided between the fourth magnetic portion 44 and the stacked body 71. The first to fourth insulating portions 47a to 47d include, for example, insulative magnetic materials. The fifth magnetic portion 47e and the sixth insulating portion 47f are, for example, nonmagnetic.

As shown in FIG. 1B and FIG. 1C, the fifth magnetic portion 75 is positioned between the first magnetic portion 41 and the second magnetic portion 42 in the first direction (the X-axis direction). The direction from the stacked body 71 toward the fifth magnetic portion 75 is taken as a third direction. The third direction crosses the first direction (the X-axis direction) and the second direction (e.g., the Y-axis direction). For example, the third direction is aligned with the Z-axis direction. The magnetic recording medium 80 is drawn for better understanding in FIG. 1B.

As shown in FIG. 1B, the reproducing portion 70 further includes a seventh insulating portion 47g. A portion of the seventh insulating portion 47g is positioned between the fifth magnetic portion 75 and the first magnetic portion 41. Another portion of the seventh insulating portion 47g is positioned between the fifth magnetic portion 75 and the second magnetic portion 42. Yet another portion of the seventh insulating portion 47g is positioned between the fifth magnetic portion 75 and the stacked body 71.

The first to seventh insulating portions 47a to 47g are not illustrated in FIG. 1C.

The fifth magnetic portion 75 applies a magnetic field (e.g., a bias magnetic field) to the stacked body 71. For example, the magnetization (a fifth magnetization 75M) of the fifth magnetic portion 75 is aligned with the third direction (e.g., the Z-axis direction). The fifth magnetization 75M may be the direction from the magnetic recording medium 80 toward the reproducing portion 70 or the direction from the reproducing portion 70 toward the magnetic recording medium 80.

For example, a magnetic field (a magnetic field due to the fifth magnetization 75M) is applied to the stacked body 71. Then, a current flows in the stacked body 71. Thereby, an oscillation is generated in the stacked body 71. For example, the stacked body 71 functions as a STO (spin torque oscillator).

A magnetic field that is based on the magnetization 83 of the magnetic recording medium 80 is applied to the reproducing portion 70 (the stacked body 71). The oscillation state of the stacked body 71 changes according to the orientation of the magnetization 83 of the magnetic recording medium 80. For example, the oscillation frequency of the stacked body 71 changes according to the orientation of the magnetization 83 of the magnetic recording medium 80. The orientation of the magnetization 83 of the magnetic recording medium 80 is detected by detecting the change of the oscillation frequency of the stacked body 71. Thereby, the information that is recorded in the magnetic recording medium 80 can be reproduced. The reproduction operation can be performed.

For example, the first magnetic portion 41 and the second magnetic portion 42 function as shields. The first magnetic portion 41 and the second magnetic portion 42 are conductive. The first magnetic portion 41 and the second magnetic portion 42 may function as a portion of a path of the current flowing in the stacked body 71.

For example, the third magnetic portion 43 and the fourth magnetic portion 44 function as shields (side shields).

As shown in FIG. 1A, the distance along the first direction (the X-axis direction) between the second magnetic portion 42 and the third magnetic portion 43 is taken as a first distance d1.

The distance along the first direction between the second magnetic portion 42 and the fourth magnetic portion 44 is taken as a second distance d2. The distance along the first direction between the first magnetic portion 41 and the third magnetic portion 43 is taken as a third distance d3. The distance along the first direction between the first magnetic portion 41 and the fourth magnetic portion 44 is taken as a fourth distance d4.

In the embodiment, the first distance d1 is different from the second distance d2. In the example, the first distance d1 is longer than the second distance d2.

By setting the first distance d1 and the second distance d2 to be mutually-different, the magnetic effect on the third magnetic portion 43 from the second magnetic portion 42 and the magnetic effect on the fourth magnetic portion 44 from the second magnetic portion 42 are different from each other. Thereby, as recited above, the orientation of a third magnetization 43M of the third magnetic portion 43 includes a component in the reverse orientation of a fourth magnetization 44M of the fourth magnetic portion 44. Thereby, the magnetic field that is applied along the Y-axis direction to the stacked body 71 from the third magnetic portion 43 and the fourth magnetic portion 44 decreases. Thereby, the stacked body 71 easily oscillates stably. Thereby, the recording density can be increased.

Because the stacked body 71 oscillates stably, for example, the change of the oscillation frequency of the stacked body 71 corresponding to the orientation of the magnetization 83 of the magnetic recording medium 80 increases. Highly-sensitive reproducing is possible because the change of the oscillation frequency is large. According to the embodiment, a magnetic head and a magnetic recording and reproducing device can be provided in which the recording density can be increased. Examples of the oscillation characteristics are described below.

In the magnetic head 110, the first distance d1 may be, for example, not less than 1.2 times and not more than 10 times the second distance d2.

In the example as shown in FIG. 1A, the third distance d3 is different from the fourth distance d4. In the example, the third distance d3 is shorter than the fourth distance d4. Thereby, the stacked body 71 easily oscillates stably. The change of the oscillation frequency of the stacked body 71 corresponding to the orientation of the magnetization 83 of the magnetic recording medium 80 increases.

As described below, the second distance d2 may be substantially 0 in the embodiment. The third distance d3 may be substantially 0. The third magnetic portion 43 may contact the first magnetic portion 41. For example, the fourth magnetic portion 44 may contact the second magnetic portion 42.

In the magnetic head 110, the orientation of a first magnetization 41M of the first magnetic portion 41 includes a reverse component of the orientation of a second magnetization 42M of the second magnetic portion 42. The orientation of the third magnetization 43M of the third magnetic portion 43 includes a component in the orientation of the first magnetization 41M. The orientation of the fourth magnetization 44M of the fourth magnetic portion 44 includes a component in the orientation of the second magnetization 42M. The orientation of the third magnetization 43M of the third magnetic portion 43 includes a component in the reverse orientation of the fourth magnetization 44M of the fourth magnetic portion 44.

In the magnetic head 110, the first magnetization 41M is aligned with the orientation from the third magnetic portion 43 toward the fourth magnetic portion 44. The second magnetization 42M is aligned with the orientation from the fourth magnetic portion 44 toward the third magnetic portion 43. The third magnetization 43M is aligned with the orientation from the third magnetic portion 43 toward the fourth magnetic portion 44. The fourth magnetization 44M is aligned with the orientation from the fourth magnetic portion 44 toward the third magnetic portion 43. As described below, various modifications of the orientations of the magnetizations are possible.

An example of the characteristics of the magnetic head will now be described.

Figure 3:
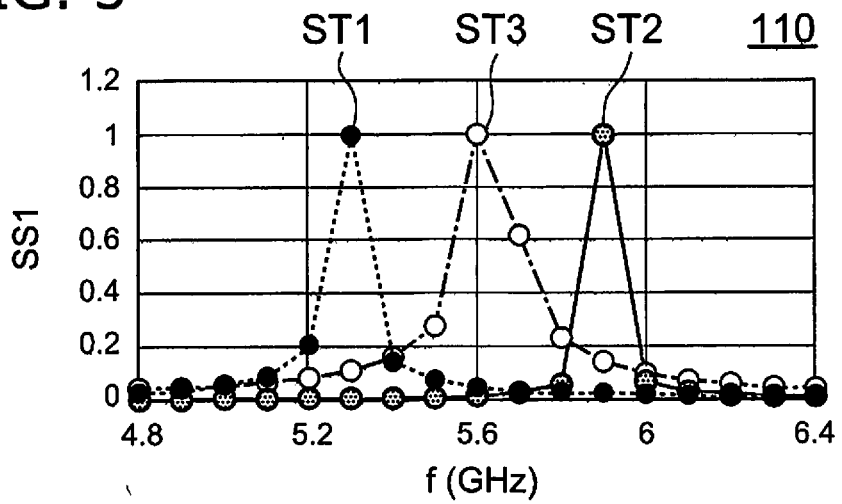
FIG. 3 is a graph illustrating characteristics of the magnetic head according to the first embodiment.

FIG. 3 is a graph illustrating characteristics of the magnetic head according to the first embodiment.

Figure 4:
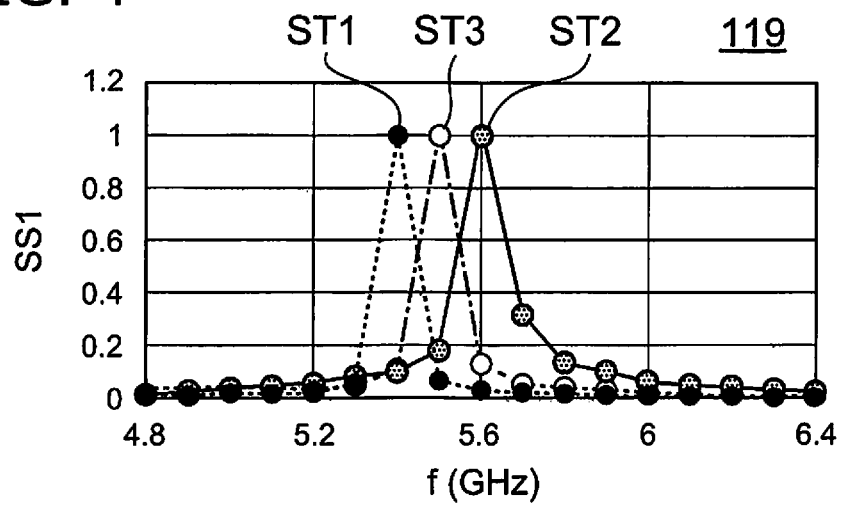
FIG. 4 is a graph illustrating characteristics of a magnetic head of a reference example.
Figure 5:
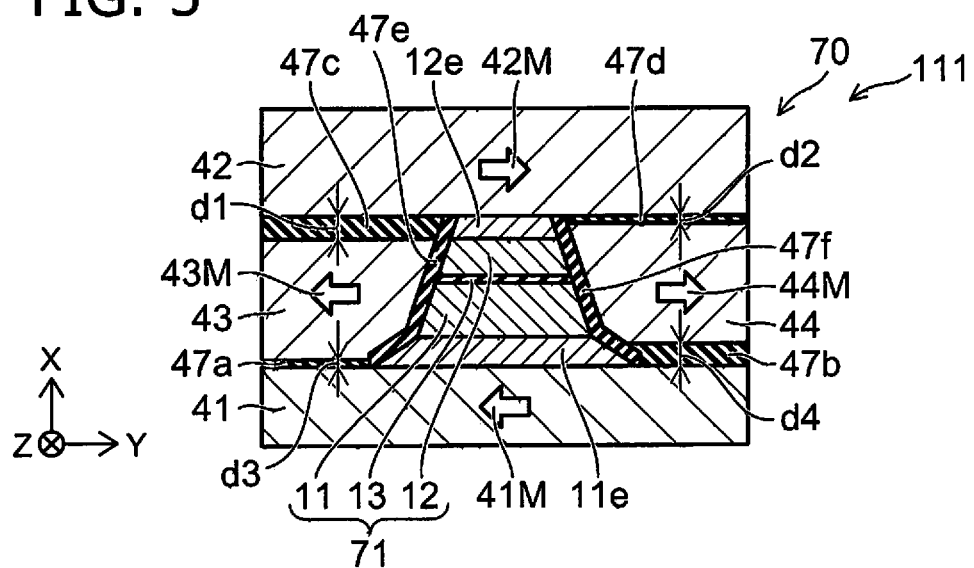
FIG. 5 is a schematic view illustrating the magnetic head according to the first embodiment.

FIG. 4 is a graph illustrating characteristics of a magnetic head of a reference example.

FIG. 3 corresponds to the magnetic head 110 recited above; and FIG. 4 corresponds to the magnetic head 119 of the reference example. In the magnetic head 110, the first distance d1 is 3 nm; the second distance d2 is 0 nm; the third distance d3 is 0 nm; and the fourth distance d4 is 3 nm. On the other hand, in the magnetic head 119, the first to fourth distances d1 to d4 are 0 nm. In the magnetic head 119, the orientation of the first magnetization 41M is rightward in FIG. 1A; the orientation of the second magnetization 42M is leftward in FIG. 1A; the orientation of the third magnetization 43M is downward in FIG. 1A; and the orientation of the fourth magnetization 44M is upward in FIG. 1A. Otherwise, the configuration of the magnetic head 119 is the same as the configuration of the magnetic head 110.

In FIG. 3 and FIG. 4, the horizontal axis is a frequency f (GHz). The vertical axis is an intensity SS1 of the oscillation spectrum. The intensity SS1 corresponds to a value obtained by performing a Fourier transformation of My/Ms corresponding to the orientation of the magnetization of the second magnetic layer 12. The frequency f at which the intensity SS1 has a peak corresponds to the oscillation frequency. In a first state ST1 in these figures, a magnetic field of the "1" state is applied to the stacked body 71 from the magnetic recording medium 80. In a second state ST2, a magnetic field of the "0" state is applied from the magnetic recording medium 80. In a third state ST3, a magnetic field is not applied to the stacked body 71 from the magnetic recording medium 80.

It can be seen from FIG. 3 and FIG. 4 that compared to the magnetic head 119 of the reference example, the difference between the frequency f at which the intensity SS1 of the oscillation spectrum has a peak in the first state ST1 and the frequency f at which the intensity SS1 of the oscillation spectrum has a peak in the second state ST2 is large in the magnetic head 110. Thus, in the embodiment, the change of the oscillation frequency is large compared to the reference example. Highly-sensitive reproducing is possible. According to the embodiment, a magnetic head and a magnetic recording and reproducing device can be provided in which the recording density can be increased.

In the embodiment, the first distance d1 is different from the second distance d2. As described above, the magnetic effect on the third magnetic portion 43 from the second magnetic portion 42 and the magnetic effect on the fourth magnetic portion 44 from the second magnetic portion 42 are different from each other. The orientation of the third magnetization 43M of the third magnetic portion 43 includes a component in the reverse orientation of the fourth magnetization 44M of the fourth magnetic portion 44. Thereby, the magnetic field that is applied to the stacked body 71 along the Y-axis direction from the third magnetic portion 43 and the fourth magnetic portion 44 decreases. Thereby, the stacked body 71 easily oscillates stably. For example, it is considered that the change of the oscillation frequency of the stacked body 71 generated by the change of the magnetic field from the magnetic recording medium 80 increases.

Several examples of the magnetic head according to the embodiment will now be described. In the description hereinbelow, a description is omitted for configurations similar to those of the magnetic head 110.

FIG. 5 to FIG. 9C are schematic views illustrating the magnetic head according to the first embodiment.

These drawings correspond to plan views when viewed along arrow AA of FIG. 1C.

As shown in FIG. 5 to FIG. 9C, the first distance d1 is longer than the second distance d2 in the magnetic heads 111 to 114 as well. The fourth distance d4 is longer than the third distance d3.

In the magnetic head 111, the first magnetization 41M of the first magnetic portion 41 is aligned with the orientation from the fourth magnetic portion 44 toward the third magnetic portion 43. The second magnetization 42M of the second magnetic portion 42 is aligned with the orientation from the third magnetic portion 43 toward the fourth magnetic portion 44. The third magnetization 43M of the third magnetic portion 43 is aligned with the orientation from the fourth magnetic portion 44 toward the third magnetic portion 43. The fourth magnetization 44M of the fourth magnetic portion 44 is aligned with the orientation from the third magnetic portion 43 toward the fourth magnetic portion 44.

In the magnetic head 112, the first magnetization 41M of the first magnetic portion 41 is aligned with the orientation from the second magnetic portion 42 toward the first magnetic portion 41. The second magnetization 42M of the second magnetic portion 42 is aligned with the orientation from the first magnetic portion 41 toward the second magnetic portion 42. The third magnetization 43M of the third magnetic portion 43 is aligned with the orientation from the second magnetic portion 42 toward the first magnetic portion 41. The fourth magnetization 44M of the fourth magnetic portion 44 is aligned with the orientation from the first magnetic portion 41 toward the second magnetic portion 42.

In the magnetic head 113, the first magnetization 41M of the first magnetic portion 41 is aligned with the orientation from the first magnetic portion 41 toward the second magnetic portion 42. The second magnetization 42M of the second magnetic portion 42 is aligned with the orientation from the second magnetic portion 42 toward the first magnetic portion 41. The third magnetization 43M of the third magnetic portion 43 is aligned with the orientation from the first magnetic portion 41 toward the second magnetic portion 42. The fourth magnetization 44M of the fourth magnetic portion 44 is aligned with the orientation from the second magnetic portion 42 toward the first magnetic portion 41.

In the magnetic heads 111 to 113 as well, the change of the oscillation frequency can be large.

In the magnetic heads 110 to 113, a first ratio (d1/d2) of the first distance d1 to the second distance d2 may be substantially the same as a second ratio (d4/d3) of the third distance d3 and the fourth distance d4. For example, the first ratio may be not less than 0.7 times and not more than 1.3 times the second ratio.

Figure 8:
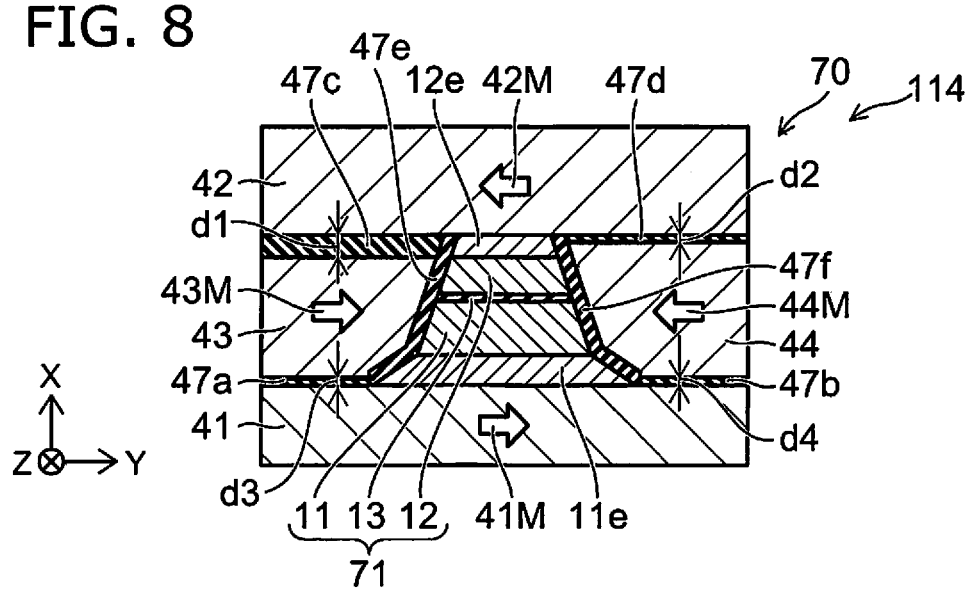
FIG. 8 is a schematic view illustrating the magnetic head according to the first embodiment.

As shown in FIG. 8, the first distance d1 is longer than the second distance d2 in the magnetic head 114 as well. On the other hand, the fourth distance d4 is substantially the same as the third distance d3.

In the magnetic heads 111 to 114 as well, the first distance d1 may be, for example, not less than 1.2 times and not more than 10 times the second distance d2.

Figure 9A:
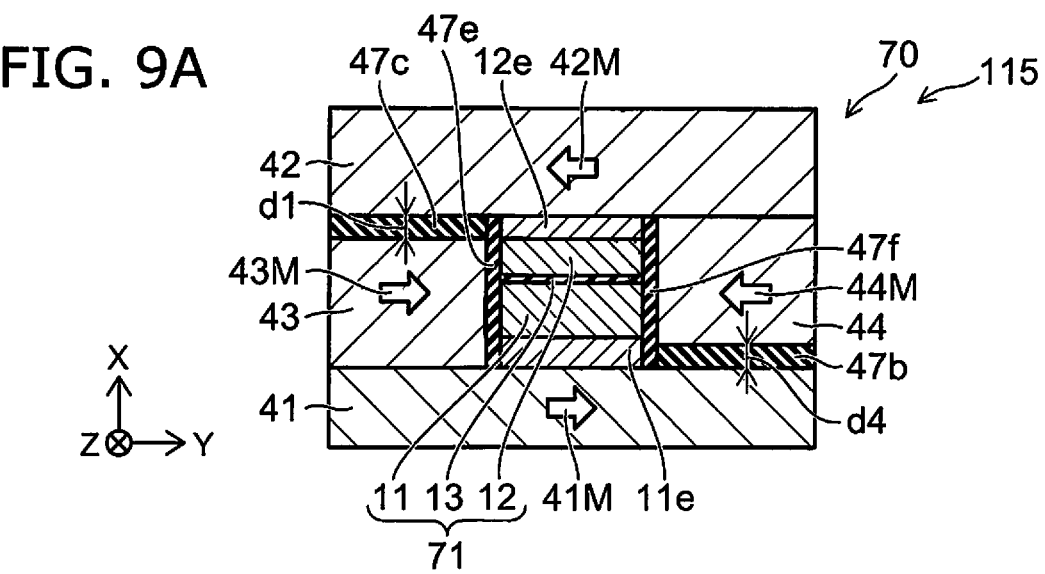
FIGS. 9A to 9C are schematic views illustrating the magnetic head according to the first embodiment.
Figure 9B:
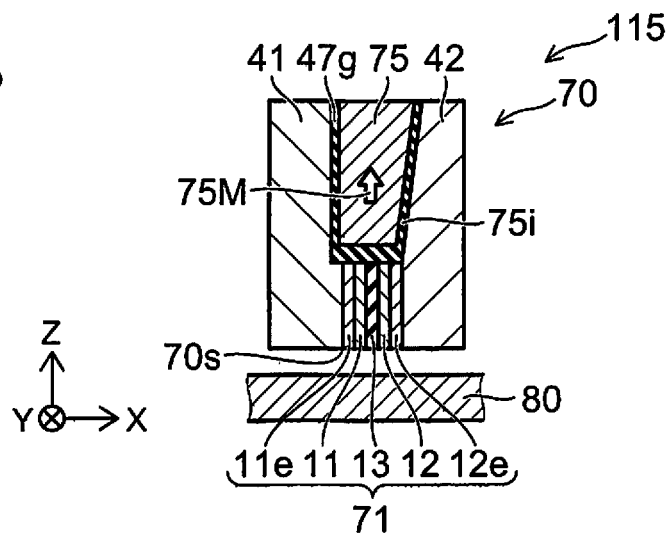
Figure 9C:
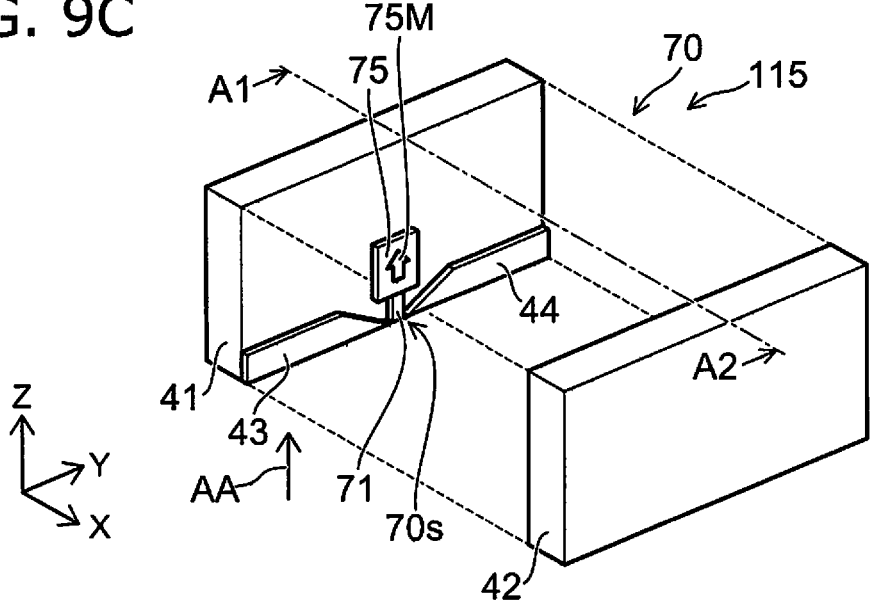

As shown in FIG. 9A, the first insulating portion 47a and the fourth insulating portion 47d are omitted from the magnetic head 115. For example, the third magnetic portion 43 contacts the first magnetic portion 41. For example, the fourth magnetic portion 44 contacts the second magnetic portion 42.

For example, the third magnetic portion 43 may be electrically connected to the first magnetic portion 41. The fourth magnetic portion 44 may be electrically connected to the second magnetic portion 42.

As in the magnetic head 115 shown in FIG. 9A, the side surface of the stacked body 71 may be aligned with the first direction (the X-axis direction).

As in the examples of the magnetic heads 110 to 115, the thickness along the first direction (the X-axis direction) of the first magnetic layer 11 may be thicker than the thickness along the first direction of the second magnetic layer 12. For example, the magnetization of the second magnetic layer 12 changes more easily. For example, a stable oscillation is obtained.

As in the examples of the magnetic heads 110 to 114, the length along the second direction (the Y-axis direction) of the first magnetic layer 11 may be longer than the length along the second direction of the second magnetic layer 12. For example, a stable oscillation is obtained.

Examples of the materials of the components included in the embodiments will now be described.

At least one of the first to fourth magnetic portions 41 to 44 includes, for example, a material such as NiFe, etc.

The fifth magnetic portion 75 includes, for example, a material such as CoCr, etc.

At least one of the first magnetic layer 11 or the second magnetic layer 12 includes a material such as CoFe, etc. In one example, at least one of the first magnetic layer 11 or the second magnetic layer 12 includes one magnetic film. At least one of these magnetic layers may include multiple magnetic films connected to each other. At least one of these magnetic layers may include a first magnetic film, a second magnetic film, and a nonmagnetic film (e.g., a Ru film) provided between the first magnetic film and the second magnetic film. The first magnetic film and the second magnetic film are antiferromagnetically coupled. At least one of these magnetic layers may include a synthetic antiferromagnetic body. At least one of these magnetic layers may include a stacked structure including a Ta film or a W film.

The intermediate layer 13 includes, for example, a nonmagnetic material such as MgO, Cu, etc.

For example, information that relates to the first to fourth magnetizations 41M to 44M and information that relates to the fifth magnetization 75M are obtained by a magneto-optical microscope, etc.

As described above, the magnetic head according to the embodiment (e.g., also including the magnetic head 110 and the like and modifications of the magnetic head 110 and the like) may further include the first interconnect 41L and the second interconnect 42L (referring to FIG. 2). One end of the first interconnect 41L is electrically connected to the first magnetic layer 11. One end of the second interconnect 42L is electrically connected to the second magnetic layer 12. The other end of the first interconnect 41L and the other end of the second interconnect 42L are connectable to the controller 70D. The controller 70D is configured to supply a current between the first magnetic layer 11 and the second magnetic layer 12.

An oscillation is generated in the stacked body 71 when the current recited above flows between the first magnetic layer 11 and the second magnetic layer 12. The frequency of the oscillation changes according to the orientation of the magnetization of the magnetic recording medium 80. In the magnetic head according to the embodiment, the information of the magnetic recording medium 80 can be reproduced using the change of the frequency of the oscillation recited above.

Second Embodiment

A second embodiment relates to a magnetic recording and reproducing device. The magnetic recording and reproducing device includes the magnetic head according to the first embodiment (and modifications thereof), the magnetic recording medium 80, and the controller 70D. The controller 70D is configured to supply a current between the first magnetic layer 11 and the second magnetic layer 12. An oscillation is generated in the stacked body 71 when the current recited above flows between the first magnetic layer 11 and the second magnetic layer 12. The magnetic recording and reproducing device reads the information of the magnetic recording medium 80 by detecting the change of the frequency of the oscillation corresponding to the orientation of the magnetization of the magnetic recording medium 80.

The magnetization 83 of the magnetic recording medium 80 (referring to FIG. 2) is aligned with the direction from the magnetic recording medium 80 toward the reproducing portion 70.

An example of the magnetic recording and reproducing device according to the embodiment will now be described. Hereinbelow, the magnetic head 110 is used as the magnetic head.

Figure 10:
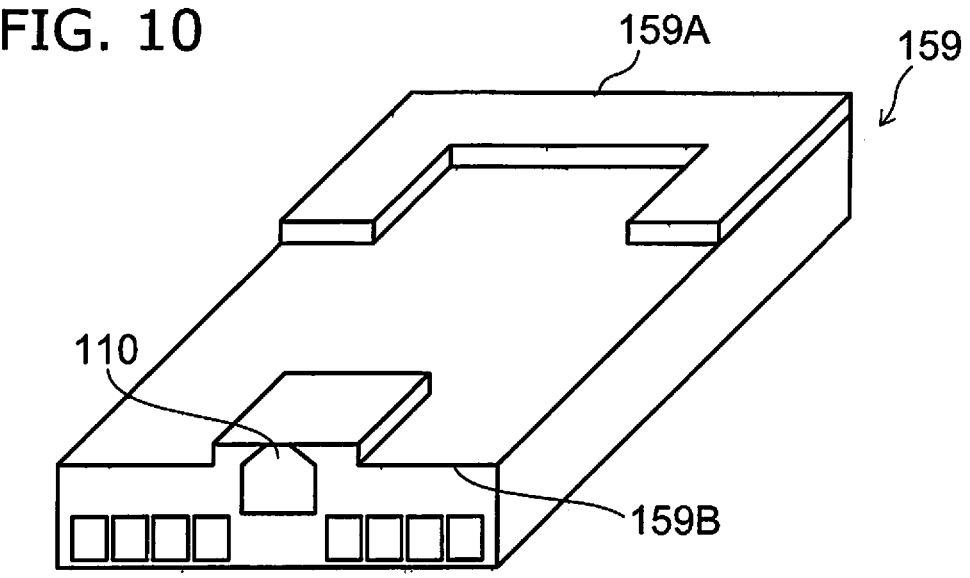
FIG. 10 is a schematic perspective view illustrating a portion of the magnetic recording and reproducing device according to the embodiment.

FIG. 10 is a schematic perspective view illustrating a portion of the magnetic recording and reproducing device according to the embodiment.

FIG. 10 illustrates a head slider.

The head slider 159 is provided in the magnetic head 110. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 11:
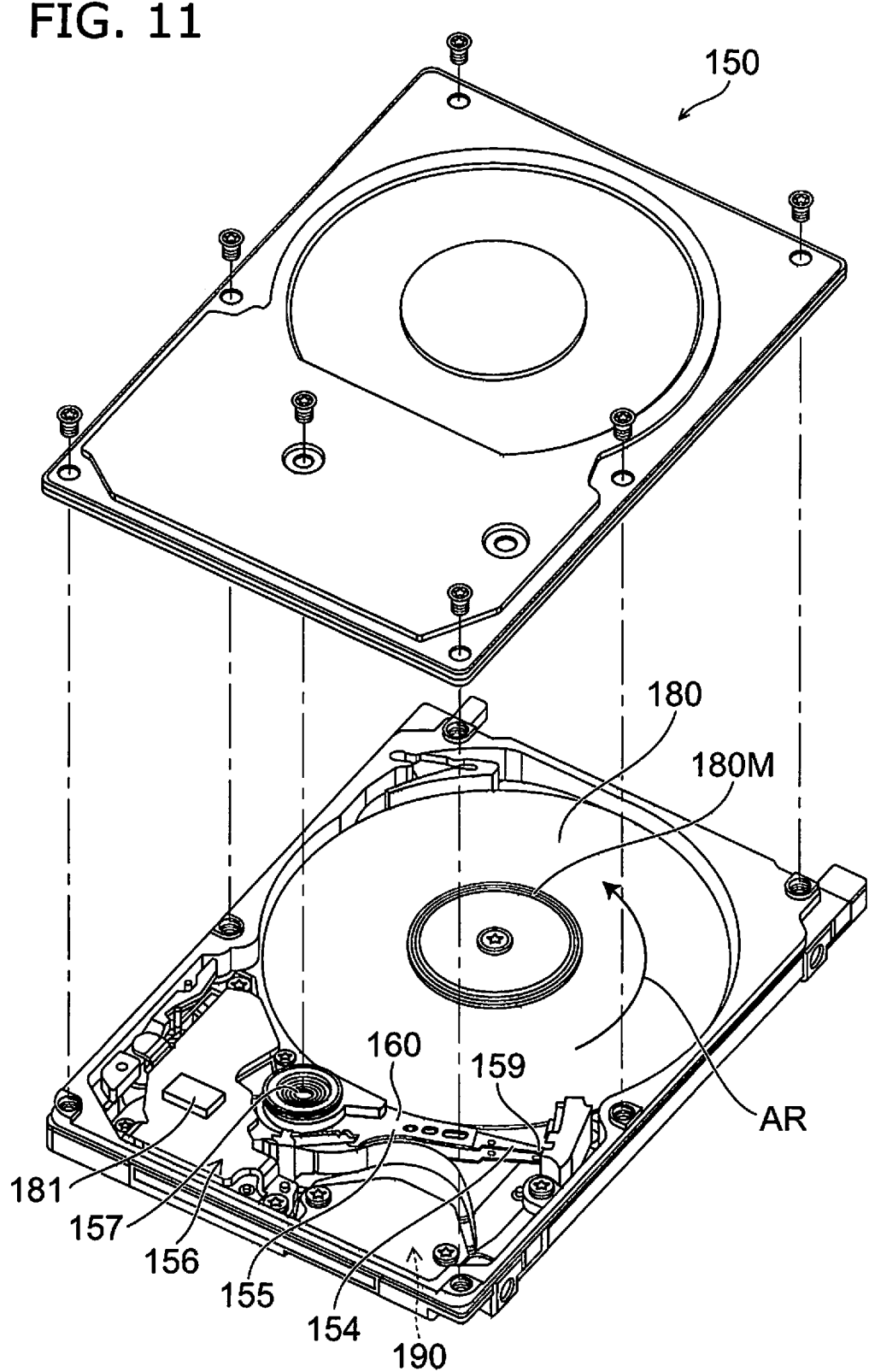
FIG. 11 is a schematic perspective view illustrating the magnetic recording and reproducing device according to the embodiment.

FIG. 11 is a schematic perspective view illustrating the magnetic recording and reproducing device according to the embodiment.

Figure 12A:
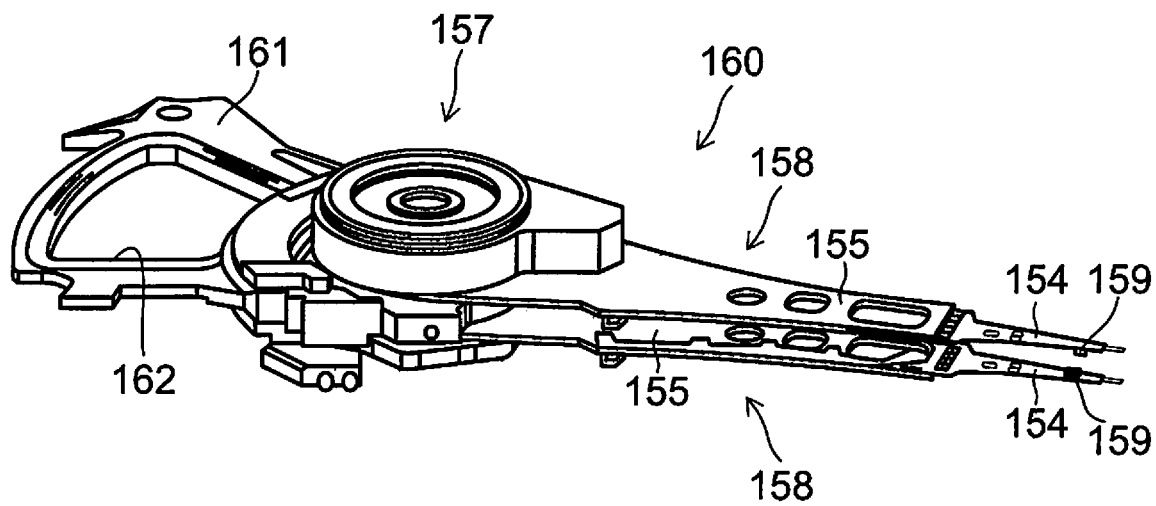
FIG. 12A and FIG. 12B are schematic perspective views illustrating a portion of the magnetic recording and reproducing device according to the embodiment
Figure 12B:
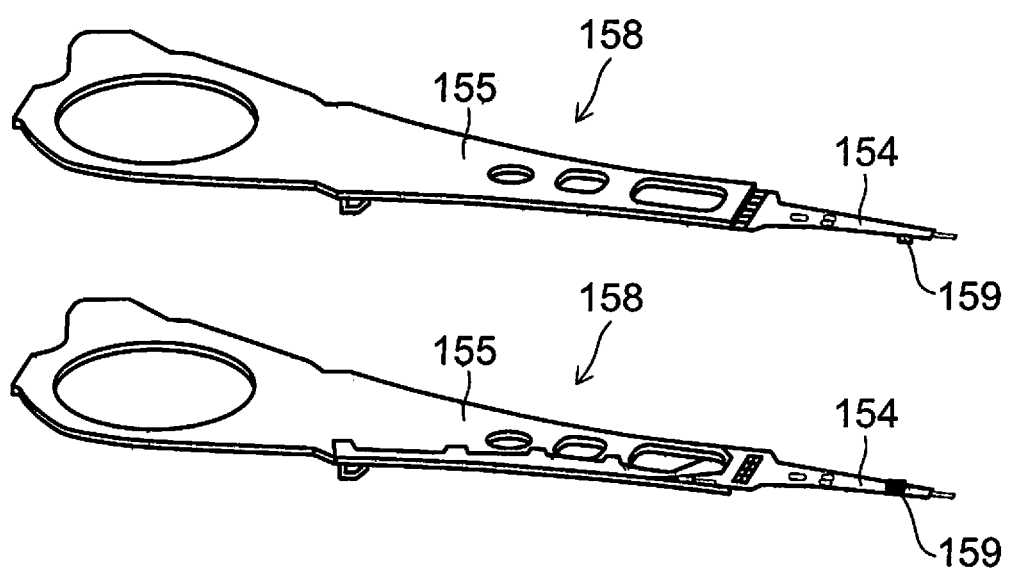

FIG. 12A and FIG. 12B are schematic perspective views illustrating a portion of the magnetic recording and reproducing device according to the embodiment.

As shown in FIG. 11, a rotary actuator is used in the magnetic recording and reproducing device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording and reproducing device 150 according to the embodiment may include multiple recording medium disks 180. The magnetic recording and reproducing device 150 may include a recording medium 181. The recording medium 181 is, for example, a SSD (Solid State Drive). The recording medium 181 includes, for example, nonvolatile memory such as flash memory, etc. For example, the magnetic recording and reproducing device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated by the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 12A illustrates the configuration of a portion of the magnetic recording and reproducing device and is an enlarged perspective view of a head stack assembly 160.

FIG. 12B is a perspective view illustrating a magnetic head assembly (a head gimbal assembly (HGA)) 158 that is a portion of the head stack assembly 160.

As shown in FIG. 12A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162.

As shown in FIG. 12B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) that are for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording and reproducing device 150. The signal processor 190 records and reproduces the signals to and from the magnetic recording medium by using the magnetic head. In the signal processor 190, for example, the input/output lines of the signal processor 190 are electrically connected to the magnetic head by being connected to electrode pads of the head gimbal assembly 158.

The magnetic recording and reproducing device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The magnetic recording and reproducing device 150 according to the embodiment includes a magnetic recording medium, the magnetic head assembly according to the embodiment, and a signal processor that records and reproduces the signals to and from the magnetic recording medium by using a magnetic head provided in the magnetic head assembly.

Figure 13A:
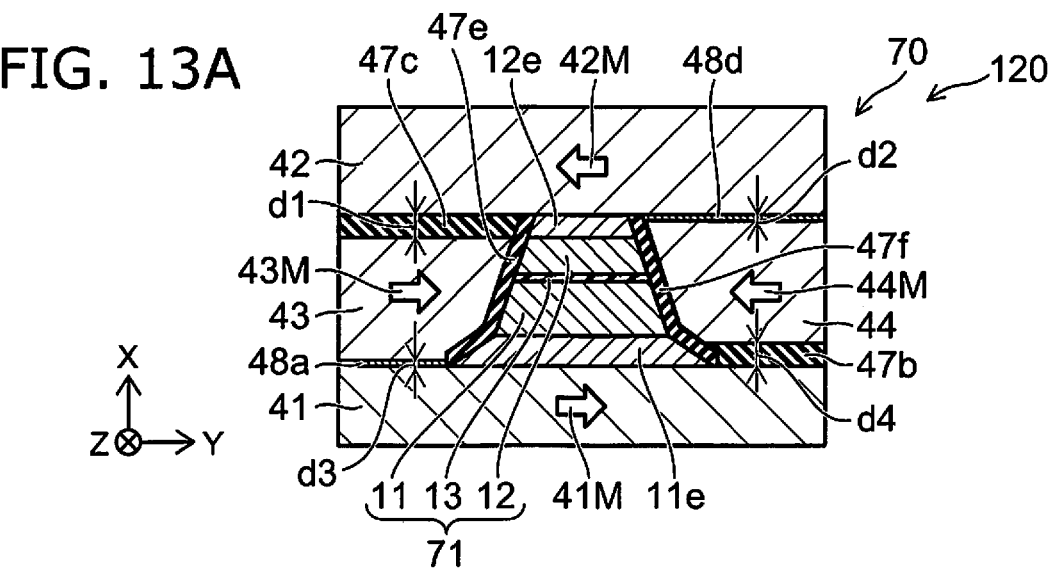
FIG. 13A to FIG. 13C are schematic views illustrating a magnetic head according to an embodiment.
Figure 13B:
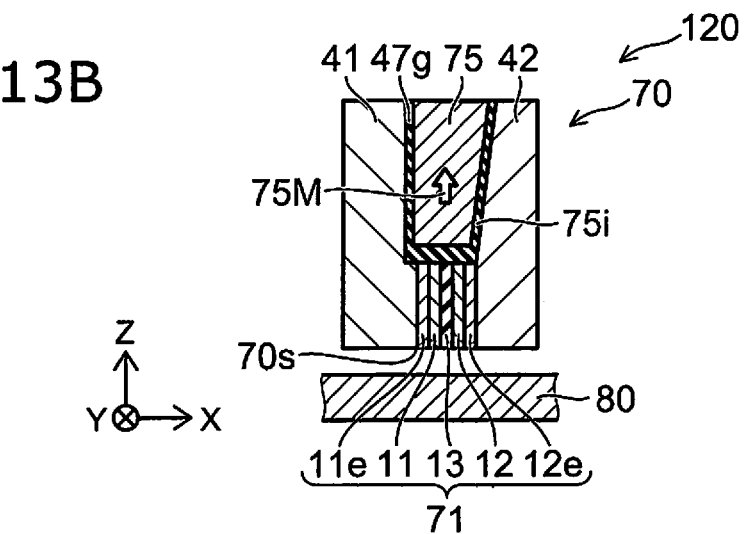
Figure 13C:
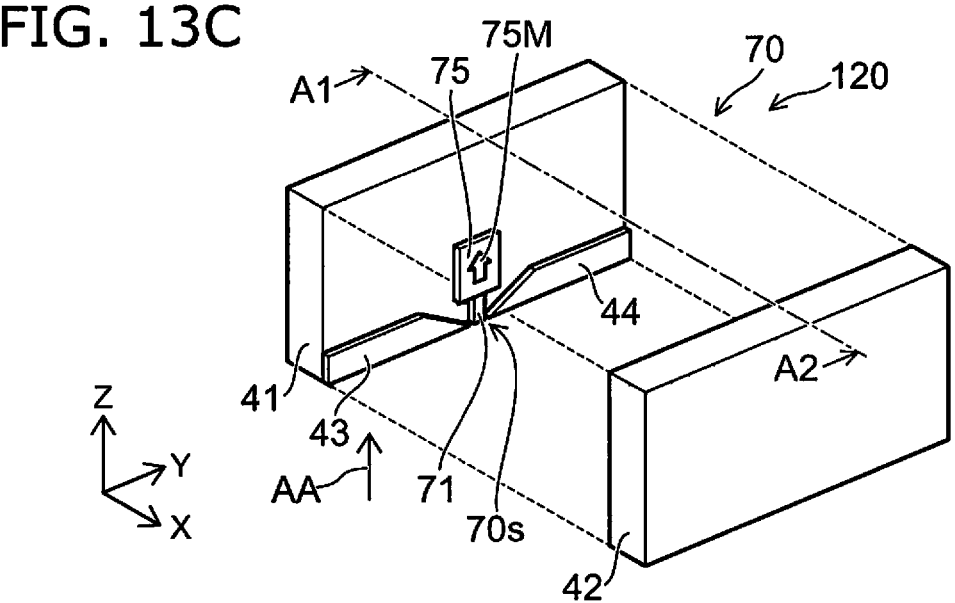

FIG. 13A to FIG. 13C are schematic views illustrating a magnetic head according to an embodiment.

FIG. 13A is a plan view as viewed along arrow AA of FIG. 13C. FIG. 13B is a line A1-A2 cross-sectional view of FIG. 13C. FIG. 13C is a perspective view.

As shown in FIG. 13A, in a magnetic head 120, the reproducing portion 70 includes a first non-magnetic conductive layer 48a and a second non-magnetic conductive layer 48d. The first non-magnetic conductive layer 48a is provided between the first magnetic portion 41 and the third magnetic portion 43. In an example, the first non-magnetic conductive layer 48a directly contacts the first magnetic portion 41 and the third magnetic portion 43. The first magnetic portion 41 and the third magnetic portion 43 are ferromagnetically coupled via the first non-magnetic conductive layer 48a. The second non-magnetic conductive layer 48d is provided between the second magnetic portion 42 and the fourth magnetic portion 44. In an example, the second non-magnetic conductive layer 48d directly contacts the second magnetic portion 42 and the fourth magnetic portion 44, for example. The second magnetic portion 42 and the fourth magnetic portion 44 are ferromagnetically coupled via the second non-magnetic conductive layer 48d, for example. These non-magnetic conductive layers may adjust a strength of the ferromagnetic coupling.

At least one of the first non-magnetic conductive layer 48a and the second non-magnetic conductive layer 48a may include at least one selected from the group consisting of Ru and Ir, for example. In this case, each thickness of the first non-magnetic conductive layer 48a and the second nonmagnetic conductive layer 48a is not less than 0.1 nm and not more than 0.35 nm, for example.

At least one of the first non-magnetic conductive layer 48a and the second non-magnetic conductive layer 48a may include at least one selected from the group consisting of Cu and Ag, for example. In this case, each thickness of the first non-magnetic conductive layer 48a and the second non-magnetic conductive layer 48a is not less than 0.1 nm and not more than 0.5 nm, for example.

Figure 14A:
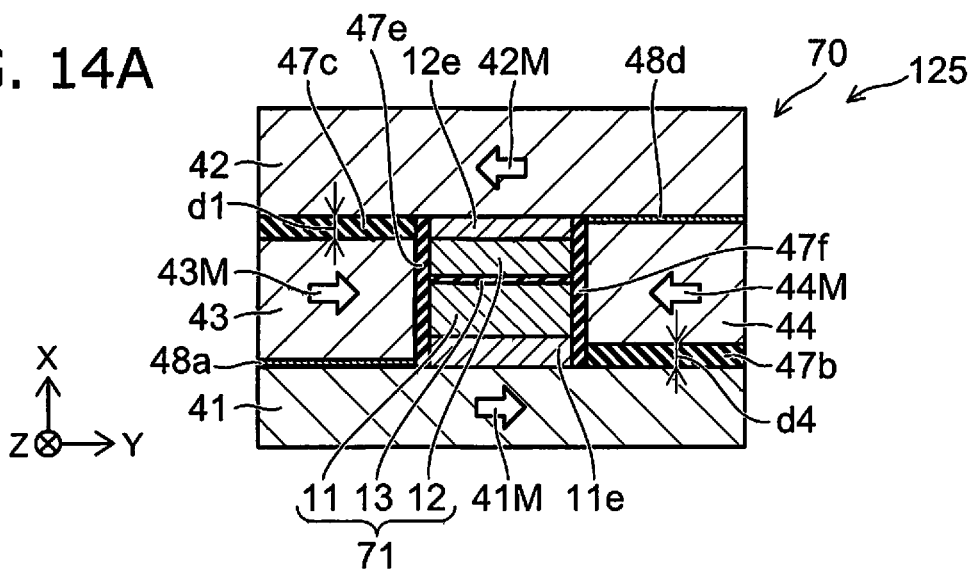
FIG. 14A to FIG. 14C are schematic views illustrating a magnetic head according to an embodiment.
Figure 14B:
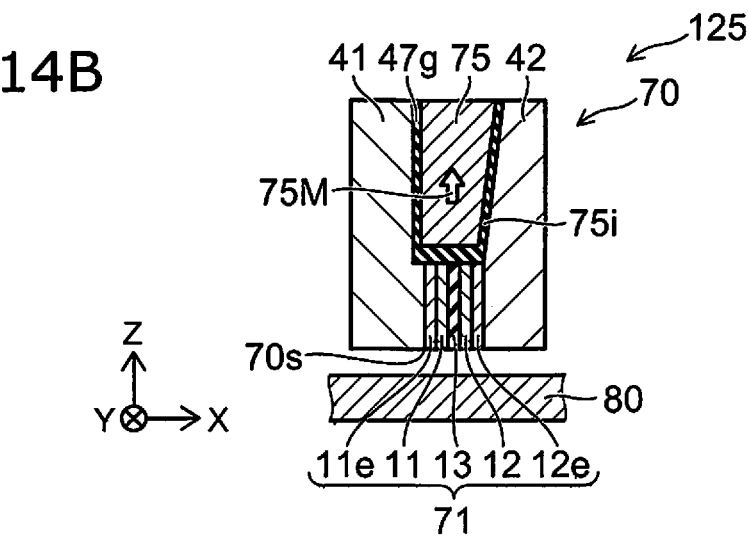
Figure 14C:
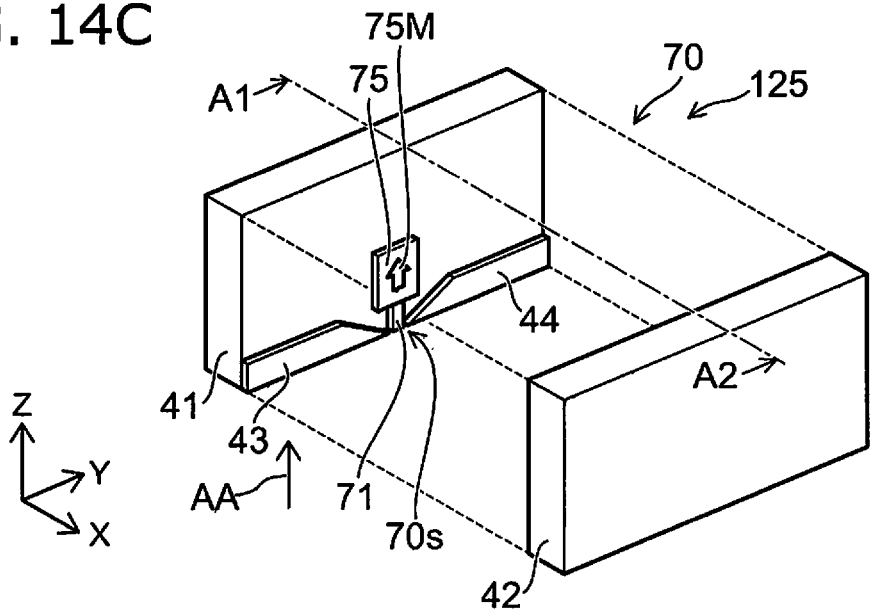

FIG. 14A to FIG. 14C are schematic views illustrating a magnetic head according to an embodiment.

FIG. 14A is a plan view as viewed along arrow AA of FIG. 14C. FIG. 14B is a line A1-A2 cross-sectional view of FIG. 14C. FIG. 14C is a perspective view.

As shown in FIG. 14A, in a magnetic head 125, the reproducing portion 70 includes the first non-magnetic conductive layer 48a and the second non-magnetic conductive layer 48d.

The embodiments include the following configurations (e.g., technological proposals).

Configuration 1

A magnetic head, comprising a reproducing portion, the reproducing portion including:
a first magnetic portion;
a second magnetic portion;
a third magnetic portion provided between the first magnetic portion and the second magnetic portion;
a fourth magnetic portion provided between the first magnetic portion and the second magnetic portion, a second direction from the third magnetic portion toward the fourth magnetic portion crossing a first direction from the first magnetic portion toward the second magnetic portion; and
a stacked body provided between the first magnetic portion and the second magnetic portion in the first direction and between the third magnetic portion and the fourth magnetic portion in the second direction,
the stacked body including:
a first magnetic layer;
a second magnetic layer provided between the first magnetic layer and the second magnetic portion in the first direction; and
an intermediate layer provided between the first magnetic layer and the second magnetic layer in the first direction, the intermediate layer being nonmagnetic,
a first distance along the first direction between the second magnetic portion and the third magnetic portion being different from a second distance along the first direction between the second magnetic portion and the fourth magnetic portion.

Configuration 2

The magnetic head according to Configuration 1, wherein the first distance is longer than the second distance,
an orientation of a first magnetization of the first magnetic portion includes a reverse component of an orientation of a second magnetization of the second magnetic portion,
an orientation of a third magnetization of the third magnetic portion includes a component in the orientation of the first magnetization, and
an orientation of a fourth magnetization of the fourth magnetic portion includes a component in the orientation of the second magnetization.

Configuration 3

The magnetic head according to Configuration 1, wherein a first magnetization of the first magnetic portion is aligned with an orientation from the third magnetic portion toward the fourth magnetic portion,
a second magnetization of the second magnetic portion is aligned with an orientation from the fourth magnetic portion toward the third magnetic portion,
a third magnetization of the third magnetic portion is aligned with the orientation from the third magnetic portion toward the fourth magnetic portion, and
a fourth magnetization of the fourth magnetic portion is aligned with the orientation from the fourth magnetic portion toward the third magnetic portion.

Configuration 4

The magnetic head according to Configuration 1, wherein
a first magnetization of the first magnetic portion is aligned with an orientation from the fourth magnetic portion toward the third magnetic portion,
a second magnetization of the second magnetic portion is aligned with an orientation from the third magnetic portion toward the fourth magnetic portion,
a third magnetization of the third magnetic portion is aligned with the orientation from the fourth magnetic portion toward the third magnetic portion, and
a fourth magnetization of the fourth magnetic portion is aligned with the orientation from the third magnetic portion toward the fourth magnetic portion.

Configuration 5

The magnetic head according to any one of Configurations 1 to 4, wherein a third distance along the first direction between the first magnetic portion and the third magnetic portion is shorter than a fourth distance along the first direction between the first magnetic portion and the fourth magnetic portion.

Configuration 6

The magnetic head according to Configuration 5, wherein
the third magnetic portion is electrically connected to the first magnetic portion, and
the fourth magnetic portion is electrically connected to the second magnetic portion.

Configuration 7

The magnetic head according to any one of Configurations 1 to 6, further comprising:
a first insulating portion provided between the third magnetic layer and the first magnetic portion; and
a fourth insulating portion provided between the fourth magnetic portion and the second magnetic portion.

Configuration 8

The magnetic head according to any one of Configurations 1 to 7, further comprising:
a third insulating portion provided between the third magnetic layer and the second magnetic portion; and
a second insulating portion provided between the fourth magnetic portion and the first magnetic portion.

Configuration 9

The magnetic head according to any one of Configurations 1 to 8, wherein a thickness along the first direction of the first magnetic layer is thicker than a thickness along the first direction of the second magnetic layer.

Configuration 10

A magnetic head, comprising a reproducing portion, the reproducing portion including:
a first magnetic portion;
a second magnetic portion;
a third magnetic portion provided between the first magnetic portion and the second magnetic portion;
a fourth magnetic portion provided between the first magnetic portion and the second magnetic portion, a second direction from the third magnetic portion toward the fourth magnetic portion crossing a first direction from the first magnetic portion toward the second magnetic portion;

a stacked body provided between the first magnetic portion and the second magnetic portion in the first direction and between the third magnetic portion and the fourth magnetic portion in the second direction;

an insulating portion provided between the fourth magnetic portion and the first magnetic portion; and another insulating portion provided between the fourth magnetic portion and the second magnetic portion, the stacked body including:

a first magnetic layer;

a second magnetic layer provided between the first magnetic layer and the second magnetic portion in the first direction; and an intermediate layer provided between the first magnetic layer and the second magnetic layer in the first direction, the intermediate layer being nonmagnetic, the third magnetic portion contacting the first magnetic portion, the fourth magnetic portion contacting the second magnetic portion.

Configuration 11

The magnetic head according to Configuration 10, wherein an orientation of a first magnetization of the first magnetic portion includes a reverse component of an orientation of a second magnetization of the second magnetic portion, an orientation of a third magnetization of the third magnetic portion includes a component in the orientation of the first magnetization, and an orientation of a fourth magnetization of the fourth magnetic portion includes a component in the orientation of the second magnetization.

Configuration 12

The magnetic head according to Configuration 10, wherein a first magnetization of the first magnetic portion is aligned with an orientation from the third magnetic portion toward the fourth magnetic portion, a second magnetization of the second magnetic portion is aligned with an orientation from the fourth magnetic portion toward the third magnetic portion, a third magnetization of the third magnetic portion is aligned with the orientation from the third magnetic portion toward the fourth magnetic portion, and a fourth magnetization of the fourth magnetic portion is aligned with the orientation from the fourth magnetic portion toward the third magnetic portion.

Configuration 13

The magnetic head according to Configuration 10, wherein a first magnetization of the first magnetic portion is aligned with an orientation from the fourth magnetic portion toward the third magnetic portion, a second magnetization of the second magnetic portion is aligned with an orientation from the third magnetic portion toward the fourth magnetic portion, a third magnetization of the third magnetic portion is aligned with the orientation from the fourth magnetic portion toward the third magnetic portion, and a fourth magnetization of the fourth magnetic portion is aligned with the orientation from the third magnetic portion toward the fourth magnetic portion.

Configuration 14

The magnetic head according to any one of Configurations 1 to 13, wherein the reproducing portion further includes a fifth magnetic portion, the fifth magnetic portion is positioned between the first magnetic portion and the second magnetic portion in the first direction, and a third direction from the stacked body toward the fifth magnetic portion crosses the first direction and the second direction.

Configuration 15

The magnetic head according to Configuration 14, wherein a fifth magnetization of the fifth magnetic portion is aligned with the third direction.

Configuration 16

The magnetic head according to Configuration 14 or 15, wherein the reproducing portion has a first surface, and at least a portion of the stacked body is positioned between the first surface and the fifth magnetic portion in the third direction.

Configuration 17

The magnetic head according to any one of Configurations 1 to 16, further comprising a first interconnect and a second interconnect, one end of the first interconnect being electrically connected to the first magnetic layer, one end of the second interconnect being electrically connected to the second magnetic layer, another end of the first interconnect and another end of the second interconnect being connectable to a controller, the controller being configured to supply a current between the first magnetic layer and the second magnetic layer.

Configuration 18

The magnetic head according to Configuration 17, wherein an oscillation is generated in the stacked body when the current flows between the first magnetic layer and the second magnetic layer, and a frequency of the oscillation changes according to an orientation of a magnetization of a magnetic recording medium.

Configuration 19

The magnetic head according to Configuration 18, wherein information of the magnetic recording medium is reproduced using the change of the frequency of the oscillation.

Configuration 20

A magnetic recording and reproducing device, comprising:

the magnetic head according to any one of Configurations 1 to 19;

a magnetic recording medium; and a controller, the controller being configured to supply a current between the first, magnetic layer and the second magnetic layer, an oscillation being generated in the stacked body when the current flows between the first magnetic layer and the second magnetic layer, information of the magnetic recording medium being read by detecting a change of a frequency of the oscillation corresponding to an orientation of a magnetization of the magnetic recording medium.

According to the embodiments, a magnetic head and a magnetic recording and reproducing device can be provided in which the recording density can be increased.

In this specification, the "state of being electrically connected" includes the state in which multiple conductive bodies are physically in contact, and a current flows between the multiple conductive bodies. The "state of being electrically connected" includes the state in which another conductive body is inserted between multiple conductive bodies, and a current flows between the multiple conductive bodies.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording and reproducing devices such as stacked bodies, magnetic layers, conductive layers, magnetic portions, and magnetic recording mediums, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, semiconductor wafers, and magnetic recording and reproducing devices practicable by an appropriate design modification by one skilled in the art based on the magnetic heads, and the magnetic recording and reproducing devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising a reproducing portion, the reproducing portion including:
    a first magnetic portion;
    a second magnetic portion;
    a third magnetic portion provided between the first magnetic portion and the second magnetic portion;
    a fourth magnetic portion provided between the first magnetic portion and the second magnetic portion, a second direction from the third magnetic portion toward the fourth magnetic portion crossing a first direction from the first magnetic portion toward the second magnetic portion; and
    a stacked body provided between the first magnetic portion and the second magnetic portion in the first direction and between the third magnetic portion and the fourth magnetic portion in the second direction, the stacked body including:
       a first magnetic layer;
       a second magnetic layer provided between the first magnetic layer and the second magnetic portion in the first direction; and
       an intermediate layer provided between the first magnetic layer and the second magnetic layer in the first direction, the intermediate layer being nonmagnetic,
    a first distance along the first direction between the second magnetic portion and the third magnetic portion being different from a second distance along the first direction between the second magnetic portion and the fourth magnetic portion.

2. The magnetic head according to claim 1, wherein
the first distance is longer than the second distance,
an orientation of a first magnetization of the first magnetic portion includes a reverse component of an orientation of a second magnetization of the second magnetic portion,
an orientation of a third magnetization of the third magnetic portion includes a component in the orientation of the first magnetization, and
an orientation of a fourth magnetization of the fourth magnetic portion includes a component in the orientation of the second magnetization.

3. The magnetic head according to claim 1, wherein
a first magnetization of the first magnetic portion is aligned with an orientation from the third magnetic portion toward the fourth magnetic portion,
a second magnetization of the second magnetic portion is aligned with an orientation from the fourth magnetic portion toward the third magnetic portion,
a third magnetization of the third magnetic portion is aligned with the orientation from the third magnetic portion toward the fourth magnetic portion, and
a fourth magnetization of the fourth magnetic portion is aligned with the orientation from the fourth magnetic portion toward the third magnetic portion.

4. The magnetic head according to claim 1, wherein
a first magnetization of the first magnetic portion is aligned with an orientation from the fourth magnetic portion toward the third magnetic portion,
a second magnetization of the second magnetic portion is aligned with an orientation from the third magnetic portion toward the fourth magnetic portion,
a third magnetization of the third magnetic portion is aligned with the orientation from the fourth magnetic portion toward the third magnetic portion, and
a fourth magnetization of the fourth magnetic portion is aligned with the orientation from the third magnetic portion toward the fourth magnetic portion.

5. The magnetic head according to claim 1, wherein a third distance along the first direction between the first magnetic portion and the third magnetic portion is shorter than a fourth distance along the first direction between the first magnetic portion and the fourth magnetic portion.

6. The magnetic head according to claim 5, wherein
the third magnetic portion is electrically connected to the first magnetic portion, and
the fourth magnetic portion is electrically connected to the second magnetic portion.

7. The magnetic head according to claim 1, further comprising:
a first insulating portion provided between the third magnetic layer and the first magnetic portion; and
a fourth insulating portion provided between the fourth magnetic portion and the second magnetic portion.

8. The magnetic head according to claim 1, further comprising:
a third insulating portion provided between the third magnetic layer and the second magnetic portion; and
a second insulating portion provided between the fourth magnetic portion and the first magnetic portion.

9. The magnetic head according to claim 1, wherein a thickness along the first direction of the first magnetic layer is thicker than a thickness along the first direction of the second magnetic layer.

10. The magnetic head according to claim 1, wherein
the reproducing portion further includes a fifth magnetic portion,
the fifth magnetic portion is positioned between the first magnetic portion and the second magnetic portion in the first direction, and
a third direction from the stacked body toward the fifth magnetic portion crosses the first direction and the second direction.

11. The magnetic head according to claim 10, wherein a fifth magnetization of the fifth magnetic portion is aligned with the third direction.

12. The magnetic head according to claim 10, wherein
the reproducing portion has a first surface, and
at least a portion of the stacked body is positioned between the first surface and the fifth magnetic portion in the third direction.

13. The magnetic head according to claim 1, further comprising a first interconnect and a second interconnect,
one end of the first interconnect being electrically connected to the first magnetic layer,
one end of the second interconnect being electrically connected to the second magnetic layer,
another end of the first interconnect and another end of the second interconnect being connectable to a controller,
the controller being configured to supply a current between the first magnetic layer and the second magnetic layer.

14. The magnetic head according to claim 13, wherein
an oscillation is generated in the stacked body when the current flows between the first magnetic layer and the second magnetic layer, and
a frequency of the oscillation changes according to an orientation of a magnetization of a magnetic recording medium.

15. The magnetic head according to claim 14, wherein information of the magnetic recording medium is reproduced using the change of the frequency of the oscillation.

16. A magnetic recording and reproducing device, comprising:
the magnetic head according to claim 1;
a magnetic recording medium; and
a controller,
the controller being configured to supply a current between the first magnetic layer and the second magnetic layer,
an oscillation being generated in the stacked body when the current flows between the first magnetic layer and the second magnetic layer,
information of the magnetic recording medium being read by detecting a change of a frequency of the oscillation corresponding to an orientation of a magnetization of the magnetic recording medium.

* * * * *